United States Patent [19]
Kinzer et al.

[11] Patent Number: 6,076,641
[45] Date of Patent: Jun. 20, 2000

[54] LARGE-WHEELED LUGGAGE CASE

[75] Inventors: Paul Kinzer, Brockton, Mass.; Amy Wolf, Providence, R.I.; William L. King, Denver, Colo.; Ryan Sullivan; Peter Twarog, both of Walpole, Mass.; Peter Ward, Providence, R.I.

[73] Assignee: Samsonite Corporation, Denver, Colo.

[21] Appl. No.: 09/165,571

[22] Filed: Oct. 2, 1998

Related U.S. Application Data

[60] Provisional application No. 60/060,926, Oct. 3, 1997.

[51] Int. Cl.[7] .................................................. A45C 5/00
[52] U.S. Cl. ................... 190/18 A; 190/109; 16/18 CG; 280/37; 220/531
[58] Field of Search ................................. 280/40, 37, 38, 280/47, 315; 190/18 A, 9, 109, 110; 16/22, 29, 18 CG; 220/531

[56] References Cited

U.S. PATENT DOCUMENTS

| | | | |
|---|---|---|---|
| 327,749 | 10/1885 | Wulff | 190/2 |
| 716,342 | 12/1902 | Livingstone | 16/18 X |
| 780,165 | 1/1905 | Flores | 190/6 |
| 1,405,585 | 2/1922 | Herold | 16/18 |
| 2,113,427 | 4/1938 | Fleisig | 190/18 A |
| 2,479,269 | 8/1949 | Scheider | 190/109 X |
| 2,483,241 | 9/1949 | Shepherd | 16/18 CG |
| 2,554,462 | 5/1951 | Huber et al. | 16/18 CG |
| 3,127,632 | 4/1964 | Rice et al. | 16/18 CG |
| 4,596,397 | 6/1986 | Conti | 190/18 X |
| 4,724,681 | 2/1988 | Bartholomew et al. | 190/18 A X |
| 4,848,782 | 7/1989 | Schmidt | 190/18 A X |
| 4,979,598 | 12/1990 | Verheij et al. | 190/18 A |
| 5,163,539 | 11/1992 | Yang | 16/18 CG X |
| 5,169,164 | 12/1992 | Bradford | 190/18 A X |
| 5,437,367 | 8/1995 | Martin | 190/18 |
| 5,833,114 | 11/1998 | Linnell | 220/531 X |

Primary Examiner—Stephen P. Garbe
Assistant Examiner—Tri M. Mai
Attorney, Agent, or Firm—Gregory W. O'Connor; Rod D. Baker

[57] ABSTRACT

A wheeled upright luggage case having oversized wheels for improved rolling movement. The luggage case has a pair of wheels that are oversize in proportion to the body of the case. The oversize wheels are rotatably mounted in fender assemblies disposed on the outsides of the body of the case, so that the oversize wheels do not detract from the cargo capacity of the case. The wheels are mounted to protrude a specified relational distance from the bottom, or the back and the bottom, of the case to permit the case to be rolled while tilted at a wide variety of angles and to easily be pulled up stairs or curbs.

3 Claims, 6 Drawing Sheets

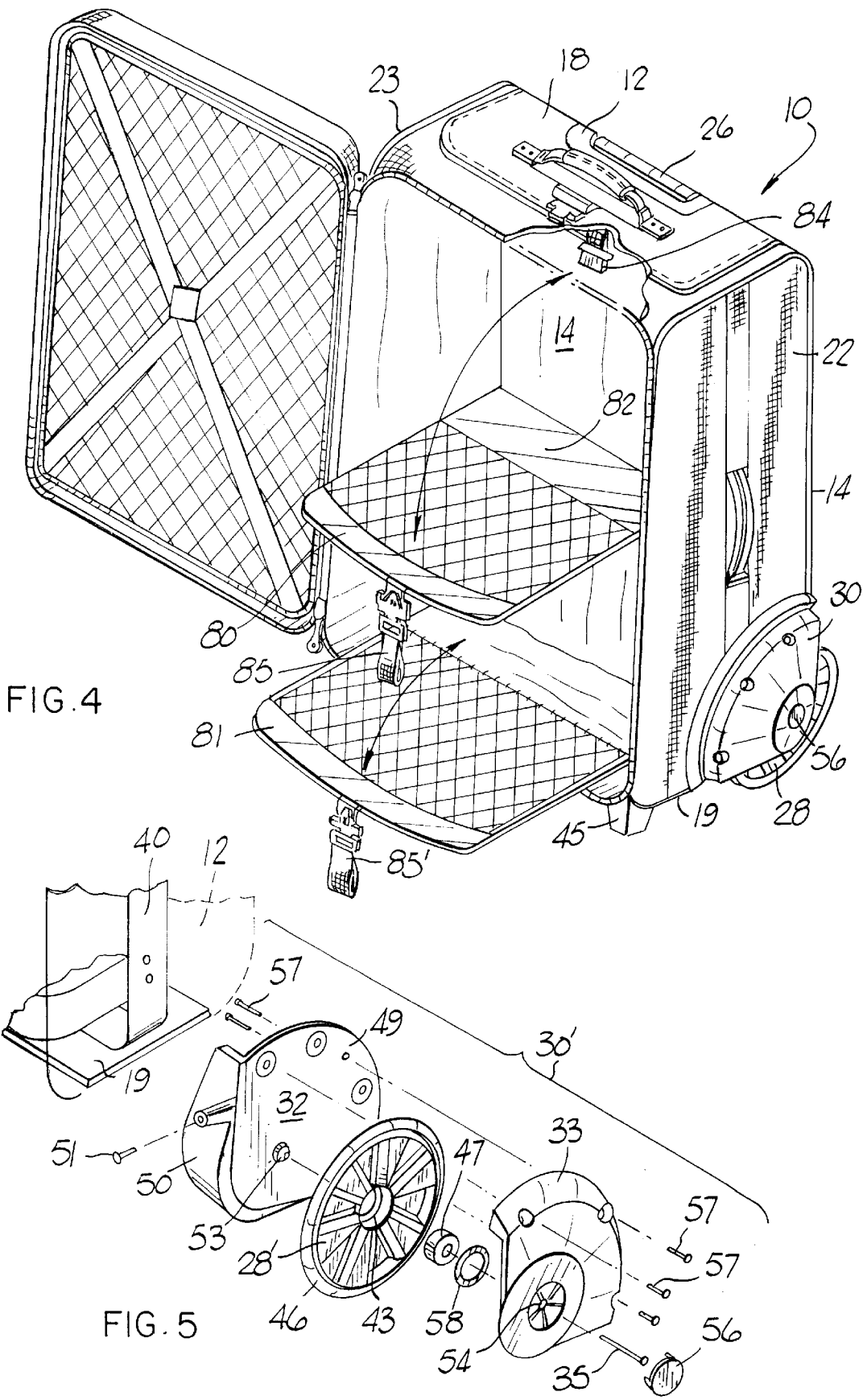

LARGE-WHEELED LUGGAGE CASE

This application claims benefit of Provisional Application Ser. No. 60/060,926, filed Oct. 3, 1997.

BACKGROUND OF THE INVENTION

1. Field of the Invention (Technical Field)

The present invention relates to luggage, particularly wheeled luggage, and specifically a stable, easily pushed or pulled, two-wheeled luggage case.

2. Background Art

Wheeled luggage cases are now the norm in the art of luggage making, and luggage without wheels have become the exception. Even luggage cases small enough to carry on board aircraft commonly are wheeled to ease the transport of a loaded case. The most popular type of wheeled luggage case currently is the upright case, which is pushed or towed with the longest or major dimension nearer to vertical than horizontal. Typically, upright cases are equipped with a wheel handle at the top end of the body of the case and a pair of wheels at the bottom edge of the back of the body. At rest, the case may sit in an upright position upon the wheels and a pair of legs or glides. To roll the case, the user grips the wheel handle and tips the case to lift the glides from the supporting surface and manually steadies the case upon the wheels for pushing or pulling.

Commonly in the art, the wheels on upright cases are relatively small. Small wheels of three inches or less in diameter are normally used to minimize weight and cost. One of the parts at highest risk for breakage on a typical luggage case is the wheels, and since small wheels do not extend far beyond the protective contours of the case, they are perceived as posing a reduced risk of breakage during handling in automated baggage systems and the like. Small diameter wheels also are frequently mounted in swivel casters upon upright cases.

However, small wheels present a substantial drawback in that they are vulnerable to "chocking," that is, the tendency for wheel rotation abruptly to stop if the wheel encounters a surface irregularity in the ground or floor. Pulling a small-diameter wheeled luggage across a bus terminal parking lot, for example, can be fraught with difficulty if the lot has numerous cracks or pebbles. When a small diameter wheel hits a crack, the luggage case may immediately stop rolling, to the frustration of the user. This undesirable chocking effect, which is amplified when the case is heavily laden, is also observed when a small-wheeled case is pulled across thick pile carpets, elevated door thresholds, elevator thresholds, etc. Small-diameter wheels also make it more difficult to pull a wheeled case up and over a curb or stair tread, since the full weight of the case effectively must be lifted, the smaller wheels being unable to roll over the edge of the curb or stair.

It is known that large wheels are less easily chocked by supporting surface irregularities. A larger diameter wheel tends to roll up and over elevated obstructions such as small stones and the like, while a small diameter wheel encounters the same obstruction and comes to a stop. Similarly, while small diameter wheels tend to fall into cracks, large diameter wheels are able to "span" and roll across cracks in the supporting surface.

Previously in the art of luggage making, however, there has been a resistance to the use of larger diameter wheels. Large wheels have been shunned as unattractive on luggage. Considerations of weight and overall case size have discouraged the use of large wheels. Large wheels have also been stigmatized, to some degree, as vulnerable to breakage when they "stick out" too far from the main body of the case. Efforts to hide and/or protect large wheels frequently have involved the placement of the wheels "inside" the body of the case, at some sacrifice of the case's internal cargo capacity. Large wheels mounted on the outside of the body of the case to minimize intrusion in the interior, though, may be mounted upon axles cantilevered from the body of the case, resulting in flimsy wheel assemblies subject to bending and breakage especially in cases heavily loaded.

A need remains, therefore, for a wheeled luggage case offering the advantages of large wheels while ameliorating or eliminating the disadvantages thereof. Against this background, the present invention was developed to provide a large-wheeled luggage case that is aesthetically attractive, comparatively lightweight, durable, and yet comfortably maneuverable while been pulled or pushed across an irregular supporting surface.

It is also known in upright cases of the type discussed above, whether these cases have large diameter wheels or not, that the main packing compartment is sometimes difficult to pack in a way that the goods are easily accessible when the case is opened up, for example, in the upright position when it's standing on the pair of wheels. Prior attempts to organize this with protruding shelves which divide the interior of the case have met with some success. Also, the use of a divider pad, that is, a stiffened panel that is sized to clip across the full width and height of the main packing compartment, also helps to organize the otherwise cavernous interior. However, past attempts to integrate these two organizing features, the shelves and the divider pad, have resulted in some people removing the divider pad in favor of only partly organizing the goods packed therein. Also, unless used together, the divider and shelves are of marginal help in preventing the carefully packed goods from accumulating in the bottom of the case and resulting in wrinkles in the packed goods at the end of the trip.

SUMMARY OF THE INVENTION
(DISCLOSURE OF THE INVENTION)

The invention relates to a wheeled upright luggage case having oversized wheels for improved rolling movement. The luggage case has a pair of wheels that are oversize in proportion to the body of the case. The oversize wheels are rotatably mounted in fender assemblies disposed on the outsides of the body of the case, so that the oversize wheels do not detract from the cargo capacity of the case. The wheels are mounted to protrude a specified relational distance from the bottom, or the back and the bottom, of the case to permit the case to be rolled while tilted at a wide variety of angles and to easily be pulled up stairs or curbs.

A primary object of the present invention is to provide a wheeled luggage case which is easy to roll across a supporting surface despite any cracks, pebbles, door thresholds, or other irregularities in the supporting surface.

Another object of the invention is to provide a wheeled luggage case which may be comfortably pushed or pulled across a supporting surface while tipped at nearly any angle.

Still another object of the invention is to provide a luggage case which incorporates oversize wheels that are lightweight yet strong.

A primary advantage of the present invention is that a luggage apparatus is provided which exploits the advantages of large wheels while minimizing the disadvantages of large wheels.

Another advantage of the invention is that a luggage apparatus is provided which is simple and inexpensively executed.

According to the invention, there is provided in a wheeled luggage case comprising a body having a back, a front, a top, a bottom, and two sides, the top and bottom defining a height dimension and the back and the front defining a depth dimension, an improvement comprising at least two wheels rotatably mounted upon the body, each of the wheels substantially parallel to one of the sides and having a peripheral rim and a diameter dimension, wherein the peripheral rim protrudes a downward distance at least a portion of the bottom, and wherein the diameter dimension is at least 55% of the depth dimension, or more preferably is between about 55% and about 80% of the depth dimension. The peripheral rim preferably protrudes a rearward distance from the back. In the most preferred embodiment, the wheel diameter dimension is at least 15% of the height dimension, and more preferably between about 15% and about 35% of the height dimension. The downward distance the wheel rim protrudes is between about 16% and about 26% of the diameter dimension, and the rearward distance, if any, preferably is between about 16% and about 26% of the diameter dimension. Most preferably, the rearward distance the wheel rim protrudes is about equal to the downward distance. Each of the wheels further comprises an axially undulate portion extending between the hub and the rim, and the undulate portion preferably defines a plurality of radially extending, substantially planar spokes wherein adjacent spokes are mutually offset and joined by a wall.

Also according to the invention, there is provided a wheeled luggage case comprising a body container within which items may be placed for transportation and having a back, a front, a top, a bottom, and two sides, the top and bottom defining a height dimension and the back and the front defining a depth dimension, at least two wheels rotatably mounted upon the body, each the wheel substantially parallel to one of the sides and having a peripheral rim and a diameter dimension, wherein the peripheral rim protrudes a downward distance below at least a portion of the bottom, and wherein the wheel diameter dimension is at least 55% of the depth dimension and at least 15% of the height dimension. The peripheral rim preferably protrudes a downward distance from the bottom of between about 16% and about 26% of the diameter dimension. The invention preferably further comprises a wheel fender disposed upon each of the sides, exteriorly to the body container, and in which one of the wheels is rotatably mounted. A wheel axle is disposed through a hub of the wheel and connected to opposing sides ol the fender. Also, at least one divider preferably is disposed within the body container in spaced relation from the back and selectively movable between a position substantially parallel to the back and a position substantially parallel to the bottom.

Also according to this invention, there is disclosed a luggage system with a divider system for promoting or maintaining organized packing of items within the interior of a body portion of the luggage case. This divider system comprises a horizontal panel extending perpendicularly from the back of the interior of the luggage case a substantial distance of the depth dimension of the interior of the case. An upper divider panel is attached permanently to its front edge. This divider extends from the front edge of the panel, and has a longitudinal dimension such that it can extend to at least half the vertical dimension of the body of the case. More preferably, this luggage case is provided with a second divider, this one attached to the bottom of the interior of the body of the case. This divider is similarly dimensioned so that extends upwardly to, and can releasably engage with, the front edge of the panel mentioned above. Also, the first divider is preferably provided with a releasably attaching device to attach its distal end to the upper wall of the interior of the body of the case. In this way, the user can organize the belongings to be transported within closeable compartments, yet these compartments can be opened up by releasing the releasable means to permit the divider panels to hinge open.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 4 is a perspective view of the embodiment of FIG. 3, showing the interior dividers in an open position, and with a portion of the case broken away to reveal a mean, for attaching a divider in a closed position;

FIG. 5 is an exploded view of a wheel assembly of a preferred embodiment;

DESCRIPTION OF THE PREFERRED EMBODIMENTS

Best Modes for Carrying Out the Invention

The invention relates to luggage apparatus, and pertains to the art of wheeled luggage whereby luggage is provided with wheels for rolling across a supporting surface. The apparatus of the present invention provides a luggage case that is readily pushed or pulled upon at least two wheels and in a generally "upright" position, that is, with the major dimension of the case usually oriented closer to the vertical than the horizontal. However, an advantage of the invention is that the apparatus may be wheeled along a supporting surface while the major dimension is tilted in any one of a multitude of angles, ranging from substantially vertical to nearly horizontal. Due to the innovative size and location of the wheels, the rolling movement of the case is smooth and even, providing substantial moving stability and maneuverability even when the rolling case encounters irregularities or minor obstructions in the floor or other supporting surface.

More particularly, and as further described herein, the apparatus of the present invention incorporates wheels having diameters much larger than the wheels customarily utilized in the art of wheeled luggage. Heretofore, wheeled luggage nearly universally has used small diameter wheels mounted at various places on the outside of the case; large diameter wheels have been avoided, despite certain advantages they offer, because of the supposition that large wheels must either obtrude an obnoxious distance from the luggage body, or occupy a precious cargo space within the body itself. The present invention offers the advantage of wheels of sufficiently large diameter to offer the benefits of big wheels, yet without compromising the capacity or the aesthetics of the case.

Figure 1:
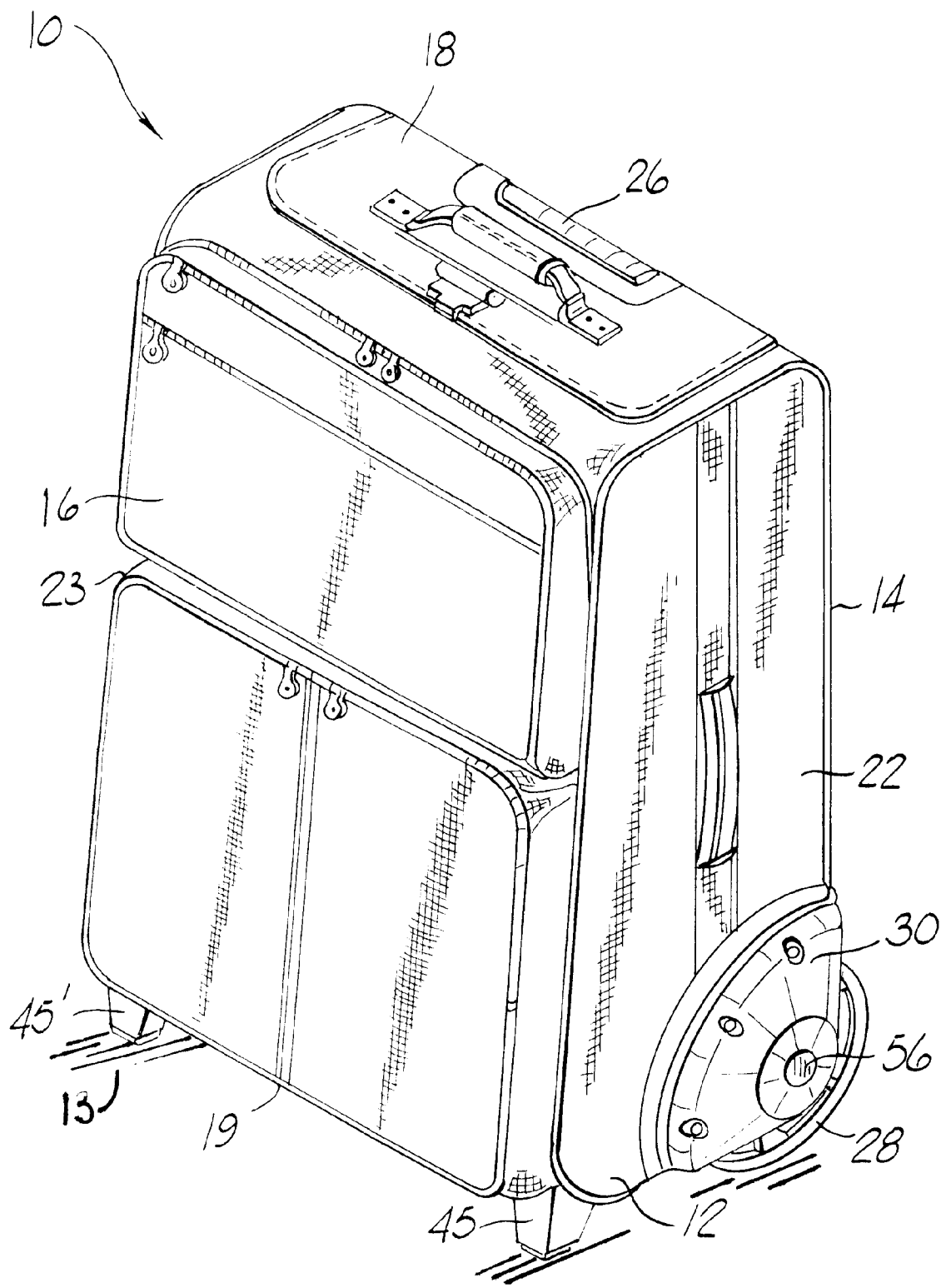
FIG. 1 is a perspective view of a preferred embodiment of the invention.
Figure 2:
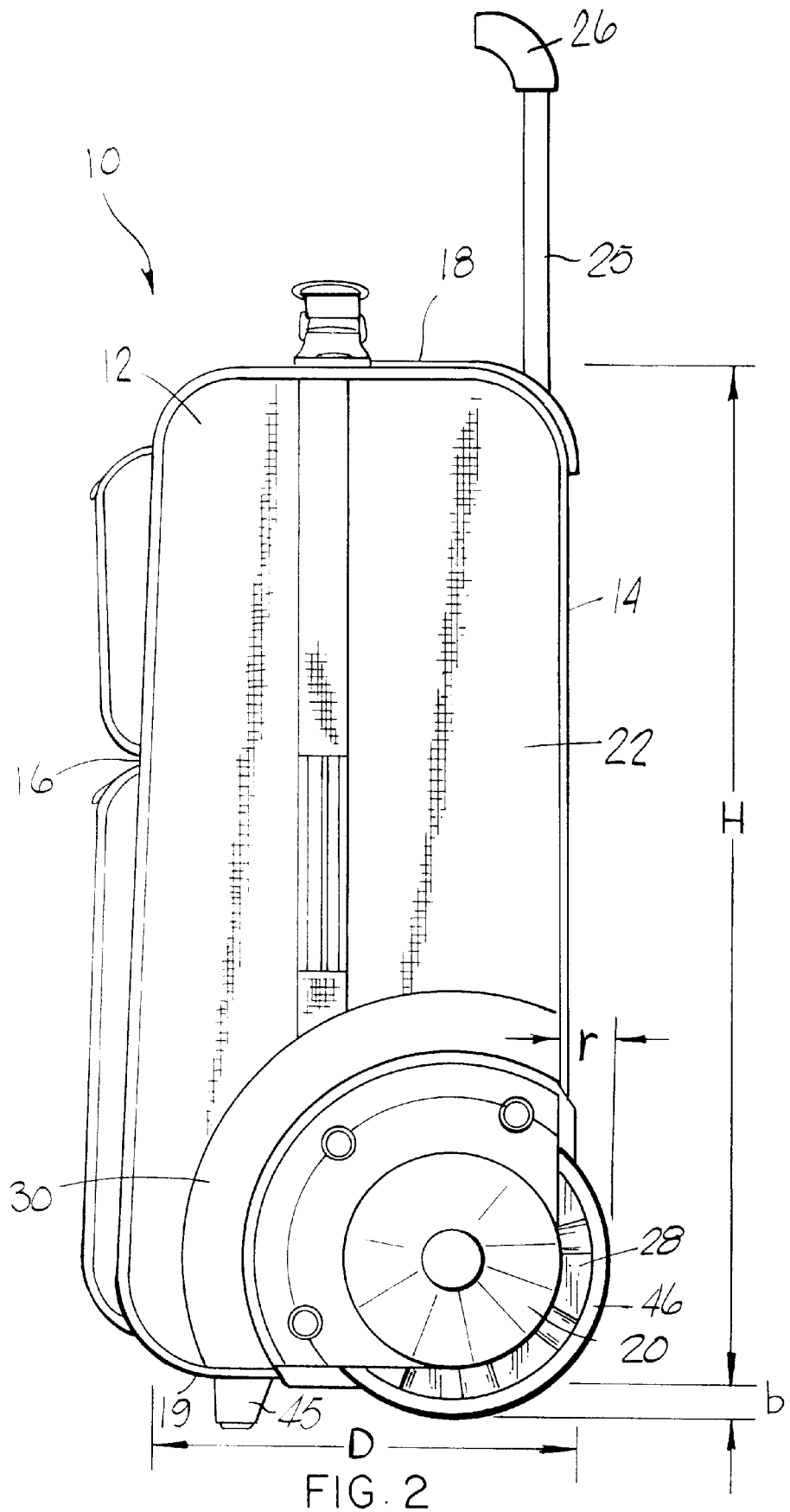
FIG. 2 is a right side view, in elevation, of the embodiment shown in FIG. 1.

FIG. 1 gives an overall view of a preferred embodiment of the invention. Broadly described, the invention includes a case 10 having a body 12 which serves as container in which clothing and other personal items may be placed for transportation. The case 10 according to the invention may be virtually any practical size, but the invention is particularly suited for use with a case 10 that is of "carry on" size to be carried aboard and stowed in passenger cabins in aircraft, buses, and the like. The body 12 has a back 14, a front 16, a top 18, a bottom 19 and two sides 22, 23. The body 12 may be of either soft-side or hard-side construction as known in the art. The body 12 may be generally parallelopiped in geometry or may have a pair or more of non-parallel panels, such as illustrated in FIG. 2, wherein the front 16 is mildly oblique with respect to the back 14 for purposes of styling and slightly to lower the center of gravity of the case 10. Preferably, the plane containing the back 14 is substantially orthogonal to the plane containing the bottom 19. The body 12 has a hollow interior to receive clothing and the like and the exterior may feature various handles, piping, pockets, and the like as shown in FIGS. 1 and 2. Notably, the case 10 preferably is equipped with an extendible/retractable wheel handle 25 and grip 26 with which the case 10 may be pushed or pulled across a supporting surface 13. The preferred embodiment of the case 10 has at least two wheels 28, 28' rotatably mounted within fenders 30, 30' proximate to the lower rear corners 20 of the body 12 defined by the back 14, bottom 19 and sides 22, 23, as further described herein. Wheels 28, 28' permit the case 10, with wheel handle 25 and grip 26 extended as shown in FIG. 2, to be tipped slightly from vertical and wheeled along the ground in a generally upright position. When the case 10 is not in use, the wheel handle 25 may be retracted by known methods to the position indicated by FIG. 1.

The body 12 has dimensions of height, width and depth, as best noted with reference to FIG. 2. The height dimension H is defined by the top 18 and the bottom 19. The top 18 and the bottom 19 typically are parallel, in which circumstance the height dimension H is the distance separating the top 18 and bottom 19. However, in alternative embodiments, the top 18 and bottom 19 may not be parallel, in which circumstance the height dimension H is approximately the average distance between the top 18 and the bottom 19. The width of the body 12 is the distance separating the two sides 22, 23. The depth dimension D is defined by the front 16 (exclusive of any exterior pockets) and the back 14. The front 16 and back 14 may be parallel, in which circumstance the depth dimension D is the distance separating the front 16 and back 14. In the preferred embodiment, the front 16 inclines slightly toward the back 14, so that the depth of the body 12 varies such that the lower portion of the body 12 is deeper than the upper portion. In this circumstance, where the front 16 and the back 14 are not parallel, the depth dimension D is approximately the average distance between the top 18 and the bottom 19.

As indicated in FIGS. 1 and 2, the wheels 28, 28' preferably number two and are rotatably mounted within corresponding fenders 30, 30' which are secured on respective sides 22, 23 of the body 12. Fenders 30, 30' are fixed upon the exterior of the body 12 and so positioned as to dispose the wheels 28, 28' substantially parallel to the corresponding one of the sides 22, 23 and preferably parallel to each other. Each one of the fenders 30, 30' as depicted in FIG. 5, preferably has two generally parallel opposing side sections, a base 32 and a cover 33, which define a hollow housing in which a wheel 28 is disposed. The fender base 32 is fixedly secured to a respective side 22 of the body 12 by attachment to the frame 40 of the case 10, and the wheel axle 35 is connected to the base 32 and the cover 33 as shall be further described.

Figure 6:
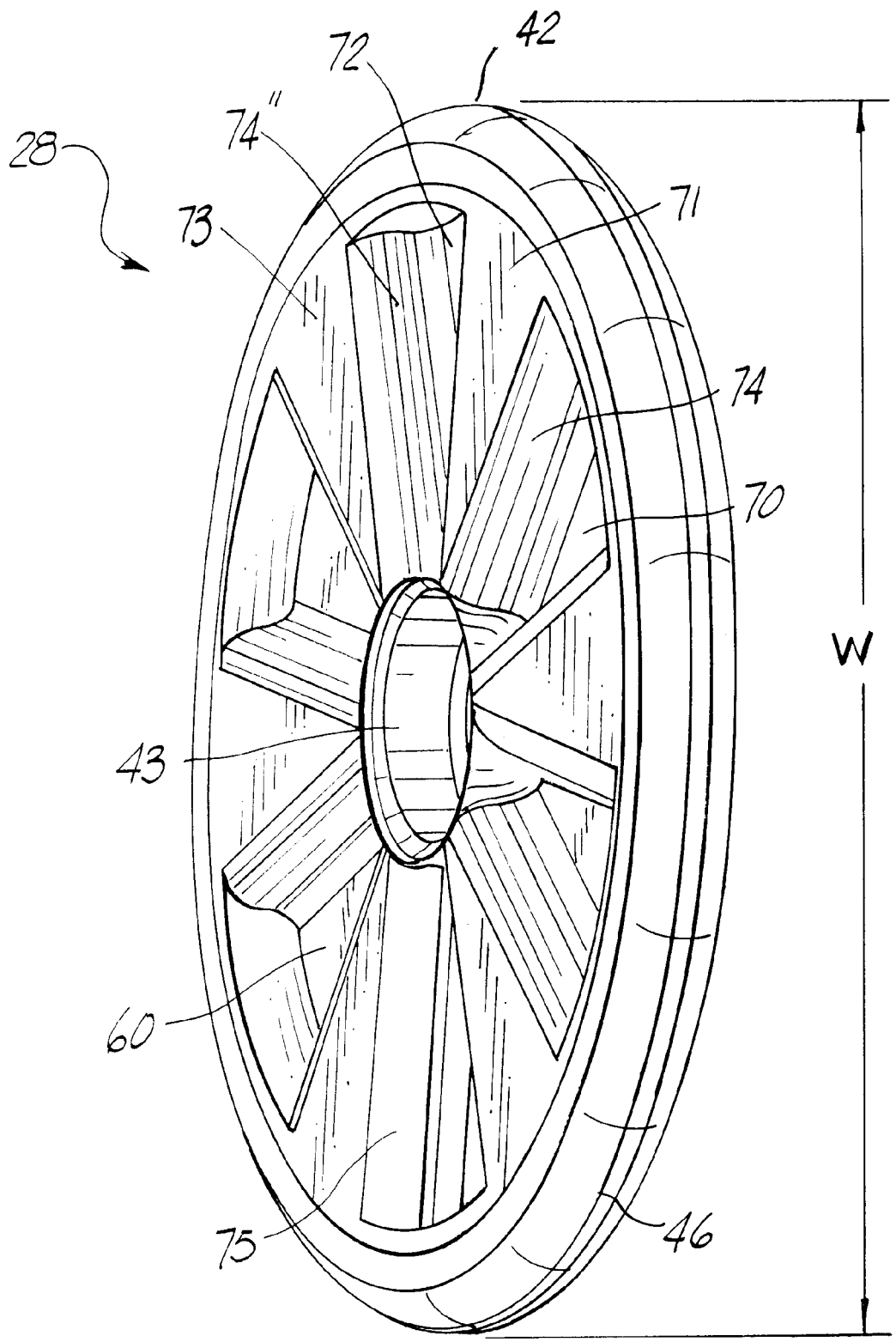
FIG. 6 is a perspective view of a wheel according to a preferred embodiment of the invention.
Figure 7:
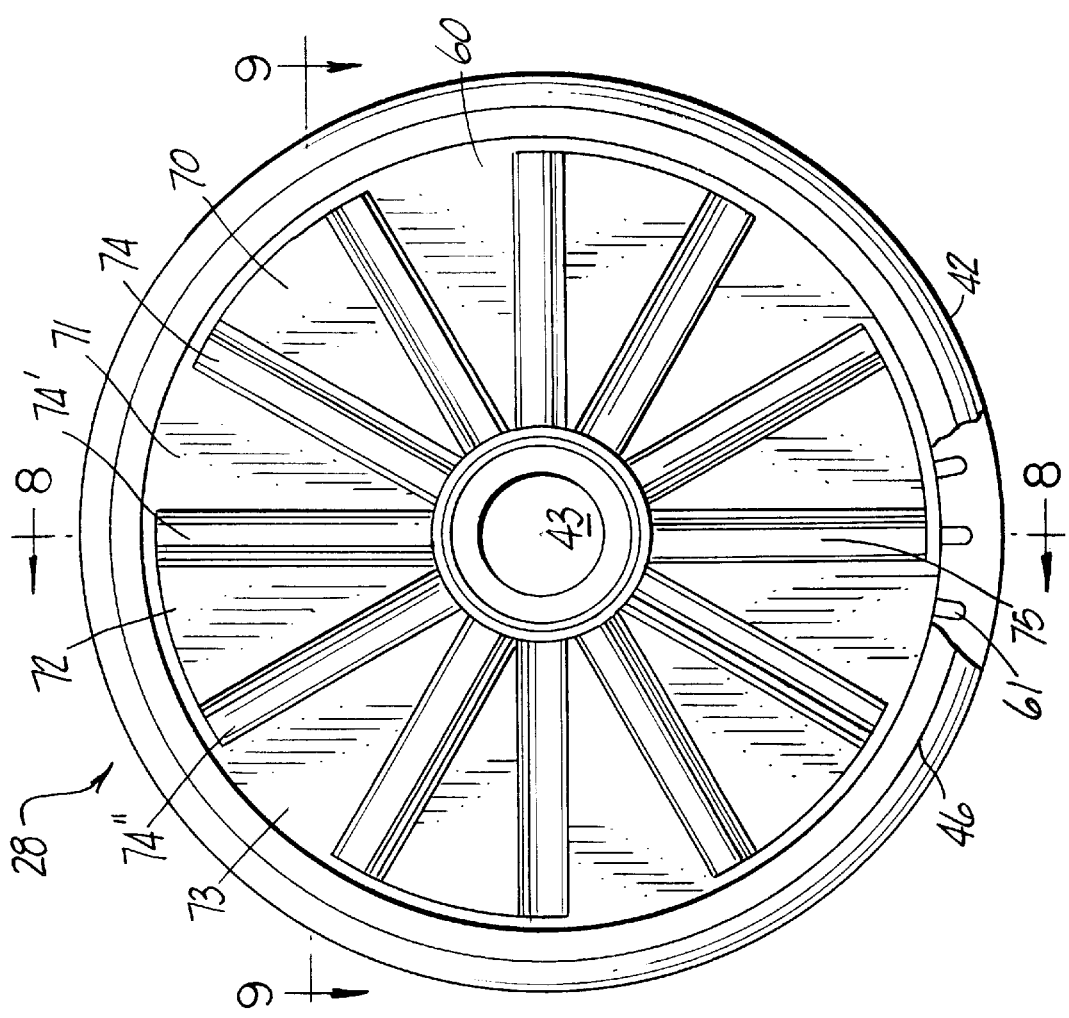
FIG. 7 is a side view of the wheel shown in FIG. 6.
Figure 8:
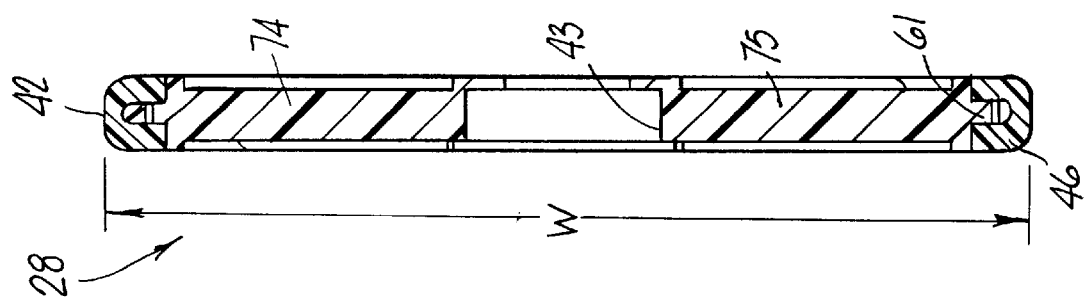
FIG. 8 is a sectional view of the wheel shown in FIG. 6, taken substantially along line 8—8 of FIG. 7.

FIGS. 6 and 7 illustrate that each wheel 28 has a diameter dimension W and a peripheral rim 42. The peripheral rim 42 preferably, but not necessarily, is defined by an elastic, shock-absorbing, circumferential tire 46. At the center of the wheel 28 is the hub 43 through which the wheel axle 35 is slidably disposed for rotatable mounting of the wheel 28 within a fender 30, 30'.

It is known in the art of wheeled vehicles generally that the larger the diameter of a wheel, the less work required to push or pull the wheel up and over a minor obstruction. Comparatively large wheels have a reduced "rolling resistance" and can revolve over obstacles which would block or "chock" wheels of a comparatively smaller diameter.

The present invention exploits the reduced rolling resistance of larger wheels by incorporating wheels 28, 28' of comparatively large diameter dimension W. The diameter dimension W of the wheels 28, 28' preferably is large enough to provide the advantages of reduced rolling resistance and increased stability when crossing rough ground door thresholds, cracked floors, gravel-strewn asphalt parking lots and the like, and yet not so large as to interfere with the other functions and the appearance of the case 10. We have determined that the diameter dimension W of the wheels 28, 28' falls within certain preferable limits having consideration for utility as well as aesthetics. The diameter dimension W of each wheel preferably is at least 55% of the depth dimension D or at least 15% of the height dimension H. More preferably, the wheel diameter dimension W is at least 15% of the height dimension H and at least 55% of the depth dimension D. Even more preferably, the diameter dimension W is between about 55% and about 80% of the depth dimension D, and between about 15% and about 35% of the height dimension H. Most preferably, in a "carry on" size case 10, the wheel diameter dimension W is about 27% of the height dimension H and about 76% of the depth dimension D.

The foregoing preferred ratios of wheel diameter dimension to the height and depth dimensions of the body 12 optimize the utility of the case 10 without adversely affecting its appearance. We have determined that a wheel diameter dimension W of less than about 15% of the height dimension is insufficient to realize the full advantage of incorporating a larger wheel. Similarly, we have determined that a wheel diameter dimension W of less than about 55% of the depth dimension D is insufficient to realize the full advantage of incorporating a larger wheel. However, we have also determined that incorporating wheels having a diameter W greater than about 35% of the height dimension H, or greater than about 80% of the depth dimension D, adversely impacts the aesthetics and maneuverability of the case 10. Accordingly, maximizing the advantages realized from the use of large wheels without crossing the threshold of diameter size that is so large as to render the case 12 unattractive and/or difficult to turn through a short turning radius, calls for a wheel diameter dimension W preferably between about 55% and about 80% of the depth dimension D of the body 12, whatever the depth dimension is selected to be; likewise, the wheel diameter dimension W is preferably between about 15% and about 35% of the preselected height dimension H of the body 12, for the same reasons.

As seen in FIGS. 1 and 2, the fenders 30, 30' and wheels 28, 28' are situated near the lower rear corner 20 where the back 14 intersects the bottom 19. In this disclosure, "rearward" and "rear" refer to a direction parallel to the direction of travel (i.e. generally parallel to the wheels 28, 28') and away from the front 16 and the back 14; the user of the case 10 typically grasps the grip 26 and stands immediately to the "rear" of the case, which is to the right in FIG. 2. "Down," and "downward" mean away from the bottom 19 directly toward the supporting surface 13 when the case 10 is at rest as shown in FIG. 2. When the case 10 is tipped to a position for rolling across a supporting surface, therefore, "downward" is not the exact direction of gravity, although the term "below" in this disclosure suggests closer to the earth in the direction of gravity.

In the most preferred embodiment, the wheel axle 35 is disposed approximately equidistantly from the back 14 and the bottom 19. Additionally, the corner 20 is rounded to a curve concentric with the wheel 28 about the axle 35. Thus, as illustrated by FIG. 2, the rim 42 and the rounded corner 20 are coaxial about the axle 35, with the result that even as the case 10 is tipped during rolling use, the body 12 rotates about the axle 35 but neither the corner 20 nor the bottom 19 contact the supporting surface. During the tipping of the case 10, the lowest point on the body 12 remains generally the same distance above the supporting surface. The body 12 can be rotated 90 from the vertical position shown in FIG. 2 to a horizontal position with the back 14 parallel to the supporting surface without any portion of the case 10 except the wheels 28, 28' and the glides 45, 45' touching the floor.

An aspect of the invention is the optimization of the amounts by which the wheels 28, 28' protrude down and rearward from the body 12. It is desirable to have the wheels 28, 28' protrude sufficiently to provide adequate clearance of the body 12 above the ground without regard for the angle at which the rolling case 10 is tilted, and yet the wheels must not protrude a distance which causes them to become ugly, awkward, overextended thereby complicating stowage in overhead bins, or prone to damage during transport.

Particular reference is made to FIG. 2. Distinct advantages of the invention are realized by the positioning of the wheels 28, 28' whereby the rim 42 of each wheel protrudes a downward distance b from the bottom 19. The downward distance b is the distance from the bottom 19 to the tangent to the rim 42 at the point of maximum protrusion. Similarly, the rim 42 of each wheel preferably protrudes a rearward distance r from the back 14. The rearward distance r is the distance from the back 14 to the tangent to the rim 42 at the point of maximum protrusion. The rearward distance r in alternative embodiments of the invention may be zero, such that the rim 42 does not protrude from the back 14 at all, but optionally is fully recessed with respect to the back. In such alternative embodiments it is desirable to have a slot in the back 14 exposing the rim 42 whose vertical tangent is about flush with the ba(k 14. Nevertheless, the most preferred embodiment of the invention has wheel rims 42 which protrude from both the bottom 19 and the back 14. In the most preferred embodiment, an arcuate section of each rim 42 protrudes beyond and around the corner 20, so that a length of rim 42 defining an uninterrupted arc of approximately 180 always visibly protrudes beyond the contour of the body 12 as seen in FIG. 2.

Notably, alternative embodiments of the invention may be constructed wherein the rim 42 protrudes below only a portion of the bottom 19, such as embodiments having, a lower corner 20 which is very wide in the vertical dimension, so that the wheels 28, 28' are mounted comparatively high upon the body 12. In such alternative embodiments, the rim 42 of each wheel 28, 28' is lower than at least a portion of the bottom 19 only when the body 12 is tilted at some angle when and while the case 10 is rolled on the wheels 28, 28' across a supporting surface (which typically is substantially horizontal). When the bottom 19 of the body 12 is rested directly and flush against the supporting surface, the rim 42 does not protrude downward from the bottom 19, but rather is above or just minimally in contact with the supporting surface (e.g. the tangent to the rim 42 is coplanar with the bottom 19).

In the preferred embodiment, the rearward distance r is between about 16% and about 26% of the wheel diameter dimension W. Also, for the particular wheel dimension W selected, the downward distance b preferably is between about 16% and about 26% of the wheel diameter dimension W. Downward distance b and rearward distance r preferably but not necessarily are equal. Most preferably, the rearward distance d and the downward distance b are substantially equal. In the most preferred embodiment, the downward distance b and the rearward distance r both equal about 21% of the wheel diameter dimension W.

The described protrusion distances of the rim 42 rearward from the back 14 and downward below the bottom 19 allow the case 10 to be wheeled across a supporting surface comfortably at almost angle of tilt. In ordinary rolling usage, the case 10 is angled somewhat from the vertical, as the user grabs the extended wheel handle 25 and tips the case toward her (to the right in FIG. 2, as the body 12 rotates clockwise about the axle 35 with the wheel 28 in contact with the floor). The amount of the tilt depends upon the height and comfort of the user. Due to the positioning of the axle 35, the protrusion of the rim 42, and the rounded character of the corner 20, the case 10 may be tilted and rolled with confidence across the supporting surface without fear that the corner 20 or some other portion of the body 12 will hit or drag the ground. Additionally, the case 10 may easily be pulled up and over curbs, or up stairways and the like, as the portion of the wheels 28, 28' which protrudes rearward from the back 14 contacts the vertical face of the curb or stair, which then permits the wheels to rotate up and over the lip or edge of the stair step or curb until the rim 42 has rotated to be in contact with the tread of the stair or a horizontal sidewalk surface.

In sum, therefore, the large wheels 28, 28' allow the case 10 to be wheeled across rough, gravelly, or cracked supporting surfaces with comparative easy and smoothness. The large wheel diameter W promotes an even ride for the case by minimizing the jarring and bumping due to surface irregularities (and which are transmitted directly to the case 10 by small diameter wheels). The case 10 also is pulled up and over curbs with ease. Yet, the protrusion of the wheels 28, 28' from the bottom 19 and back 14 of the case is optimized so that the wheels are not likely to extend so far as to interfere with the stowage of the case, or to be bent or broken during processing in airport automated baggage transport systems, and the like. When the case 10 is not in use, it may be placed at rest in the upright position shown in FIGS. 1 and 2, with the wheels 28, 28' and the glides 45, 45' in supporting contact with the supporting surface.

FIGS. 2 and 5 show the assembly and positioning of the fenders 30, 30'. The fenders 30, 30' serve to enclose and support the wheels 28, 28'. A fender 30 or 30' is disposed on each of the sides 22, 22' of the body 12, substantially at the lower rear corner 20. In one embodiment, the fender includes a fender base 32 which is shaped to conform to the exterior of the body 12 in the vicinity of the lower rear corner 20, such that a principal planar portion 49 of the base 32 may be secured flush against the exterior of a side 22 or 22' of the body 12. An arcuate flange portion 50 of the base 32 extends generally orthogonally from the planar portion 49 and is adapted to correspond to and be generally coaxial with the radial contour of the lower rear corner 20 and may be secured by a back screw 51 penetrating a portion of the frame 40 in the back 14.

A significant advantage of the invention is that a single mold set may be utilized to fashion the fender 30 and wheel 28' for either side of the case 10. The fender 30 assembly and wheel 28' are identical for either side of the case 10; the assembly is merely reversed or "flipped" in orientation for positioning on an opposite side of the body 12. Moreover, the fender assembly 30 may be constructed to be attachable to bodies of different size. Provided the angle of intersection between the bottom 19 and back 14 is uniform among various bodies 12, the fender and wheel assembly of the invention can be mounted upon a variety of case 12 sizes. The need to manufacture fenders 30 and wheels 28 in a variety of differing sizes for attachment to different sized bodies is reduced or eliminated.

Reference particularly is made to FIG. 5. A raised axle support 53 with central hole is provided upon the inside face of the planar portion 49 of the base 32, into which the inside end of the wheel axle 35 is received. Wheel 28' has a central hub 43 into which a bearing assembly 47 is disposed. Bearing assembly 47 allows for reduced friction rotation of the wheel 28' about the axle 35. Fender cover 33 is provided and shaped to complement the base 32 whereby the base 32 and the cover 33 are the two laterally opposing sides of the fender 30' which substantially enclose the wheel 28'. The fender cover 33 has an axle hole 54 in which the outer end of the axle 35 is journaled or secured. The axle 35 is slidably disposed through the axle hole 54, through the bearing assembly 47, and into the axle support 53. A hub cap 56 securely insertable into the exterior of the fender cover 33 holds and supports the outside end of the wheel axle 35. The entire fender and wheel assembly is secured together and to the body 12, as by screws 57 or the like which hold the cover 33 to the base 32 and the base 32 to the frame 40 or other component of the body 12. One or more washers 58 may be employed to reduce friction between the wheel 28' or bearing assembly 47 and either the cover 33 or the base 32. Accordingly, the wheel axle 35 is disposed through the hub 43 and is connected to opposing sides 32, 33 of the fender 30.

In this manner, the wheel 28' is mounted wholly exteriorly to the body 12 so the oversize character of the wheel 28' and its supporting axle 35 do not occupy or affect any portion of the interior cargo capacity of the body 12. Yet, as the axle 35 is connected to the base 32 and the cover 33, the wheel 28' is supported not by a cantilevered axle, but by a dually supported axle 35 for durability. The frictionless bearing assembly 47 allows for a smooth, rotatable mounting of the wheel 28' within the fender 30'. Notably, the oversized wheel diameter dimension W allows for the use of a proportionally larger axle 35 and larger bearing assembly 47 than commonly encountered in the art. Larger bearing and axle components more widely disperse the frictional forces of a rotating wheel 28' and thus reduce the heat generated during wheel rotation and thus prolong bearing 47 and wheel 28' life. Additionally, the larger wheel diameter results in fewer wheel rotations per unit of distance traveled, when compared to the number of rotations of a small diameter wheel over the same distance.

Attention is invited to FIGS. 6–9, illustrating one preferred embodiment of the wheel 28 for use in the apparatus of the invention. The wheel 28 preferably is manufactured from sturdy plastic using known molding techniques. In the preferred embodiment, the wheel 28 has an axially undulate intermediate portion 60 extending from the hub 43 to the peripheral rim 42. "Axially undulate" means that the intermediate portion 60 of the wheel 28 has an overall wavelike form whereby the portion 60 does not present two substantially conical or planar outwardly facing surfaces (as most commonly encountered in the art), but rather presents two complementary outward surfaces which undulate in directions parallel to the axis of the wheel 28.

Figure 9:
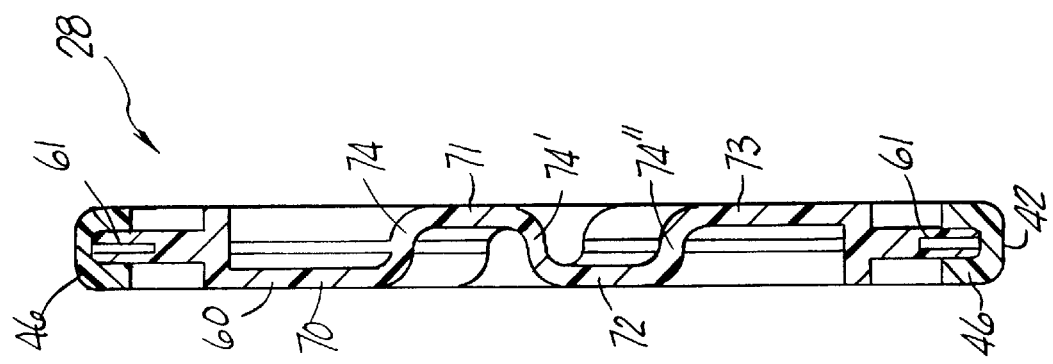
FIG. 9 is a sectional view of the wheel shown in FIG. 6, taken substantially along line 9—9 of FIG. 7.

The inventive shape of the intermediate portion 60 is best seen in the cross section shown in FIG. 9. The peripheral rim 42 has a thickness which defines the overall maximum axial thickness of the wheel 28. A cross section of the intermediate portion 60 taken across a chord of the circle defined by the rim 42 shows that the intermediate portion 60 is fashioned from a comparatively thin member which undulates between the thickness extremes of the peripheral rim 42, so that the intermediate portion 60 is corrugated with a plurality of waves radiating in an asteriated pattern from the central hub 43. This construction of the intermediate portion 60 provides a wheel that is very strong yet lightweight despite the comparative oversize of the wheel diameter dimension W.

The preferred embodiment of FIG. 9 is further characterized as having a plurality of radially extending substantially planar spokes 70, 71, 72, 73. Because of the undulating character of the intermediate portion 60, adjacent spokes (e.g. 70 and 71) are mutually offset by a distance generally corresponding to the thickness of the rim 42. Adjacent spokes (e.g. 70 and 71) are joined by a wall 74 so that adjacent spokes are not coplanar and yet are joined to define the integral intermediate portion 60. This relationship between adjacent spokes is repeated circumferentially about the wheel 28. Spoke 71 is adjacent to spoke 72 and joined by wall 74', and spoke 72 is adjacent to spoke 73 and joined thereto by wall 74". The walls 74, 74' and 74" preferably are curved in cross section as seen in FIG. 9. Accordingly, adjacent spokes (e.g. 70, 71 or 72, 73) occupy opposite positions on the axial thickness of the wheel 28 so that the intermediate portion 60 undulates between the opposing Lateral sides of the wheel 28. However, pairs of the various walls 74, 74', 74" are diametrically aligned (e.g. walls 74' and 75 in FIG. 8) to provide tremendous radial rigidity to the wheel 28. In alternative embodiments, the spokes 70, 71, 72, 73 need not be planar, but themselves may be curved so that the spokes and the walls 74, 74', 74" define an undulating series of complimentary waves marked by complimentary swells and canals on opposite sides of the wheel 28.

The foregoing wheel construction, whereby the intermediate portion 60 defines a plurality of radiating, wave-like spokes, permits the construction of a preferred embodiment which is lightweight despite the size of the wheels 28, 28' and yet is durable and strong. The larger wheels 28, 28' provide a gentler ride by distributing shocks through a larger wheel assembly, and yet the axially undulate portion 60 is strong and manufactured with known molding equipment.

In the preferred embodiment, the peripheral rim 42 is provided with a rubber tire 46 to absorb bumping shocks and improve the durability and appearance of each of the wheels 28, 28'. The tire 46 may be molded directly upon the circumference of the intermediate portion 60, which circumference may be provided with a circumferential flange or, preferably, a plurality of uniformly disposed radially extending connection pins 61 which extend into the tire 46 to secure it in place.

Figure 3:
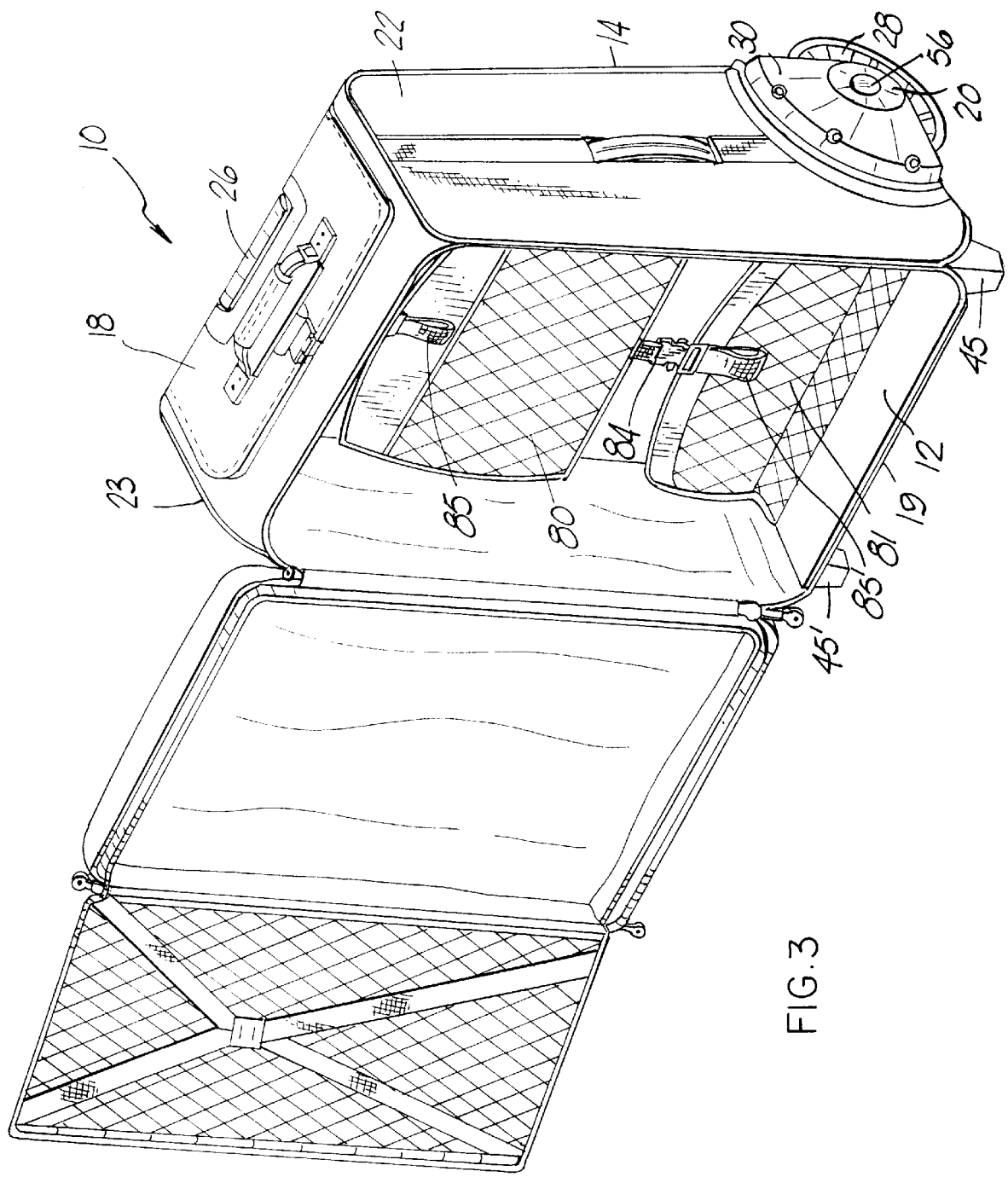
FIG. 3 is a perspective view of the embodiment of FIG. 1, showing the case in an opened position to reveal certain interior features, including interior dividers in a closed position.

FIGS. 3 and 4 show that alternative embodiments of the invention may optionally be provided with a divider system having one or more movable dividers 80, 81. Dividers 80, 81 promote and maintain organized packing of items within the interior of body 12. In the preferred embodiment, a horizontal panel 82 is extendable perpendicularly from the back 14 a distance (e.g. one half the depth dimension D) into the interior of the body 12. Panel 82 is attached permanently or removably to the inside of the back 14. The connection of the panel 82 to the back 14 is flexible, as by a living hinge. The top divider 80 is hingably connected to the front edge of the panel 82. The bottom divider 81 is hingably connected to the inside of the bottom 19 along a line spaced a distance (e.g. one half the depth dimension D) away from the back 14. The front edges 90 and 91 of the respective panels 80, 81 are stiffened somewhat, such as by a thin sheet of flexible plastic. The dividers 80, 81 preferably are fashioned from a mesh or netting material known in the art, so as to be transparent and fully flexible.

The dividers 80, 81 are movable between a closed position shown in FIG. 3 and an open position shown in FIG. 4. The hinged connection between the dividers 80, 81 and the panel 82 and bottom 19, respectively, maintain the dividers in spaced relation from the back 14, but leave them selectively movable between the closed position substantially parallel to the back and an open position substantially parallel to the bottom. With the dividers 80, 81 in open position, and with the panel 82 swung into a position perpendicular to the back 14, clothes ol other items may be packed against the back 14 between the panel 82 and the top 18. When the volume between the panel 82 and the top 18 is filled, the panel 80 is pivotally moved (as indicated by the directional arrow in FIG. 4) to a position about parallel to the back 14. A strap fastener 85 is then removably connected to a clip or buckle 84 and the strap cinched to pull the divider 80 tightly against the packed clothes. The volume between the panel 82 and the bottom 19 similarly is then substantially filled with luggage items, and the lower panel 81 pivotally moved (as indicated by the directional arrow in FIG. 4) to the closed position shown in FIG. 4 and the strap cinched tight to hold the stowed items in place between the panel 81 and the back 14. Clips or other fasteners 84 are mounted upon the underside of the panel 82 and upon the underside of the top 18 (FIG. 4), with complementary fasteners 85, 85' upon the dividers 80, 81, to permit the dividers to be temporarily clipped or snapped into the closed position. With the dividers 80, 81 in closed position parallel to back 14 as shown in FIG. 3 to hold the stowed items against the back 14, the user may then pack the volume between the dividers 80, 81 and the front 16 of the body 12. The dividers 80, 81 therefore provide a convenient means for compartmentalizing the interior of the body 12 to maintain the stored luggage items in order during luggage transport and handling, and particularly to prevent the packed items from shifting to the bottom of the case 10 when the case is placed upright.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited are hereby incorporated by reference.

What is claimed is:

1. An upright wheeled luggage case comprising a body portion for containing the goods of a traveler and a pair of wheels, the body portion having a back panel, a front panel, a top panel, a bottom panel, and two side panels forming an overall parallelopiped shape, the body portion having an overall height dimension, a depth dimension and a width dimension, the distance between the top panel and bottom panel defining the height dimension, the distance between the back panel and the front panel defining a depth dimension, and the distance between the two side panels defining the width dimension, the improvement comprising, a pair of fenders disposed on each of the side panels of the body portion for supporting the two wheels, each of the fenders comprising a fender base shaped to conform to the exterior of the body portion in the vicinity of the intersection of the bottom panel, a side panel and the rear, the fender base including a planar portion mounted to extend generally parallel to the side panel, an arcuate flange portion extending generally orthogonally from the planar portion, the flange portion sized to engage at least a portion of the back panel and bottom panel, and a fender cover shaped to fit over the fender base, the fender cover and fender base including means for axially supporting a wheel therebetween, the fender base and fender cover including means for receiving a plurality of fasteners for holding the fender base and fender cover together and for supporting said wheel therebetween, each of said fenders being sized to position said wheel to protrude beyond the back panel and bottom panel of said case by an equal amount, whereby an identical fender can be used to support a wheel from either of the side panels.

2. The improvement of claim 1 wherein each of said wheels includes a hub for connecting the wheel to the fender and a rim, and further comprises an axially undulate portion extending between said hub and said rim.

3. The improvement of claim 2 wherein said axially undulate portion defines a plurality of radially extending, substantially planar spokes wherein adjacent spokes of said plurality of planar spokes are mutually offset and joined by a wall.

* * * * *